Jan. 27, 1959
A. C. BROCKMAN
2,871,027
SEMI-TRAILER STRUCTURE AND TRACTOR
AND SEMI-TRAILER COMBINATION
Filed June 21, 1956
4 Sheets-Sheet 1
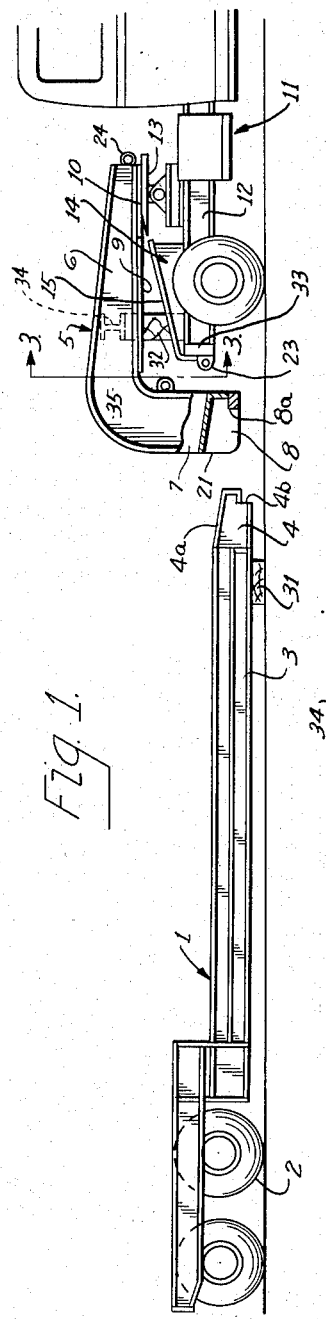
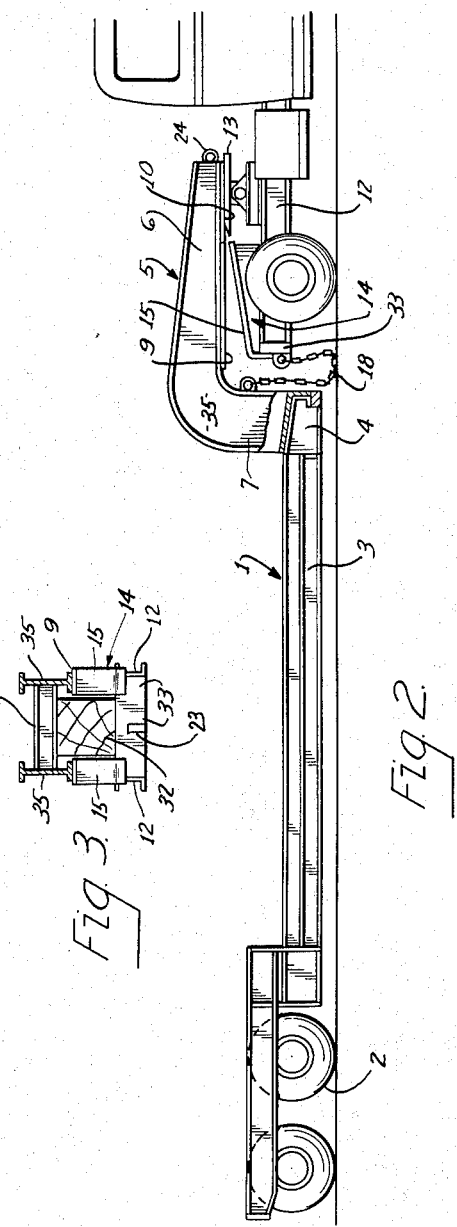
INVENTOR.
Arthur C. Brockman,
BY
Barnes Kisselle Laughlin & Raisch
ATTORNEYS.

Jan. 27, 1959
A. C. BROCKMAN
2,871,027
SEMI-TRAILER STRUCTURE AND TRACTOR
AND SEMI-TRAILER COMBINATION
Filed June 21, 1956
4 Sheets-Sheet 2
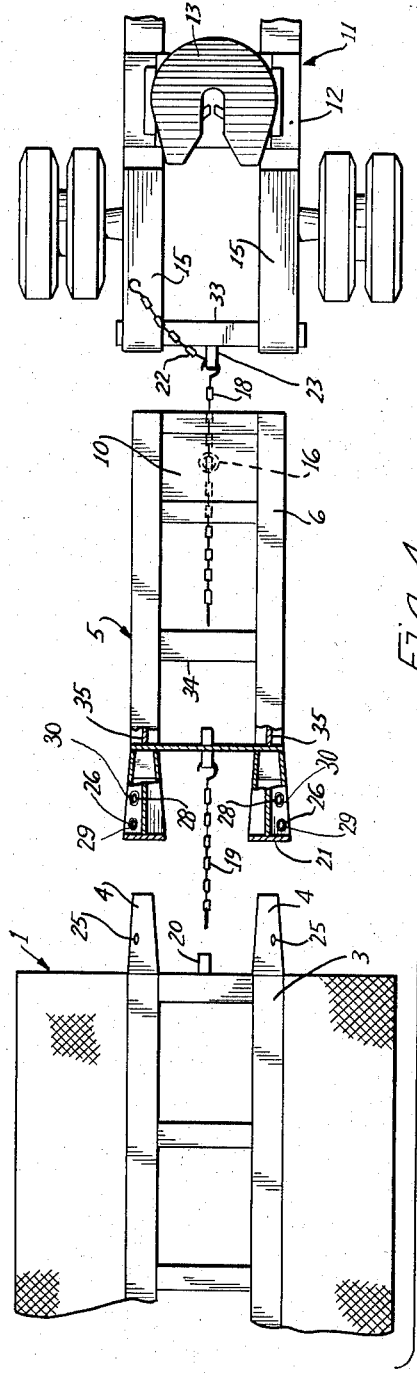
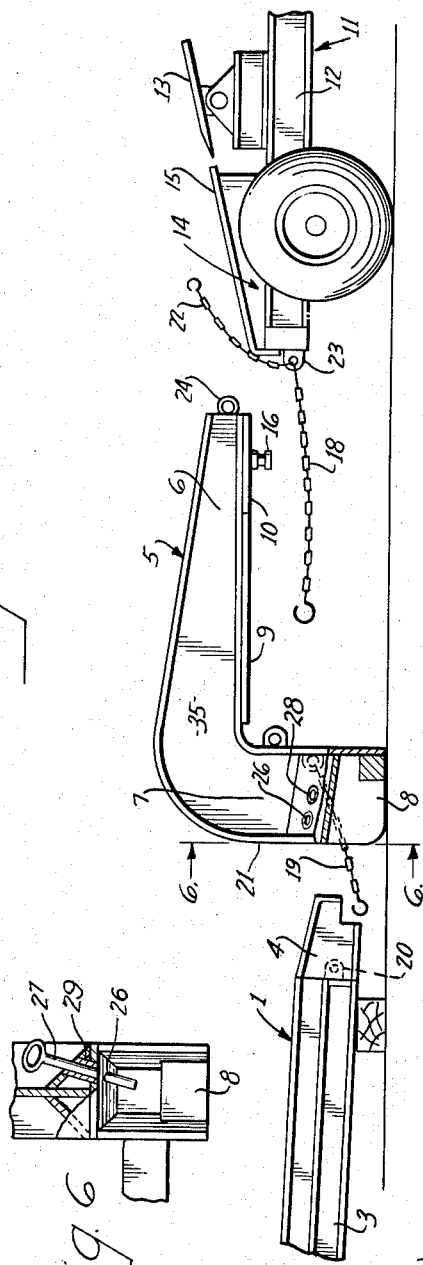
INVENTOR.
Arthur C. Brockman
BY
Barnes, Kisselle, Laughlin & Raisch
ATTORNEYS.

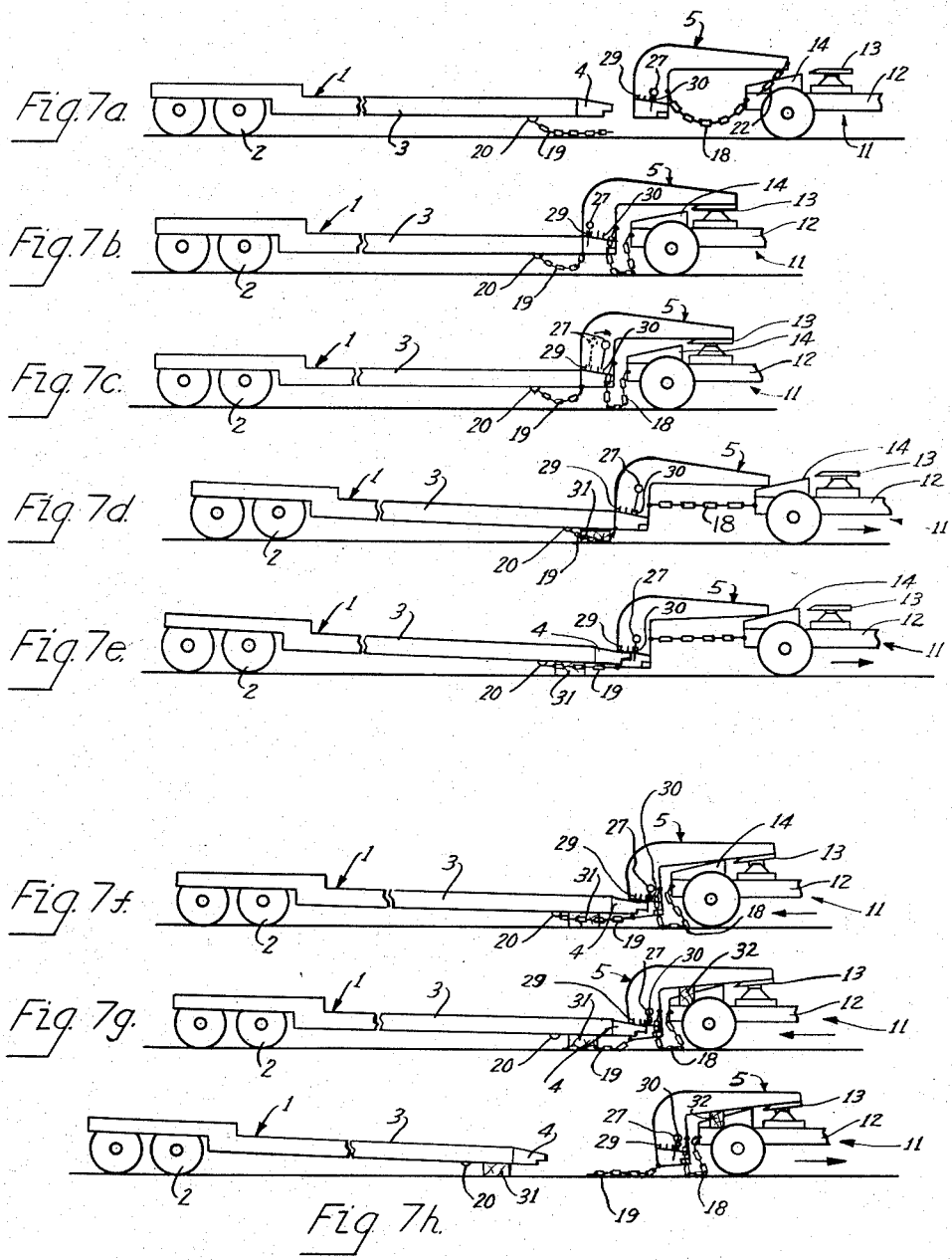

Jan. 27, 1959  A. C. BROCKMAN  2,871,027
SEMI-TRAILER STRUCTURE AND TRACTOR
AND SEMI-TRAILER COMBINATION
Filed June 21, 1956  4 Sheets-Sheet 4
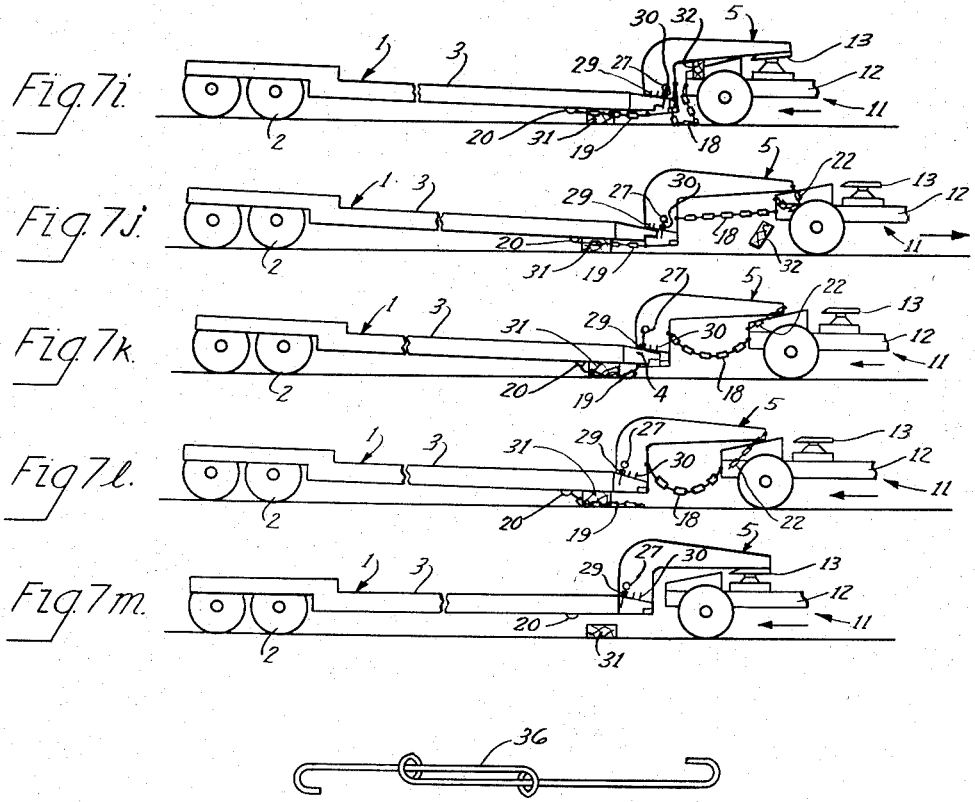
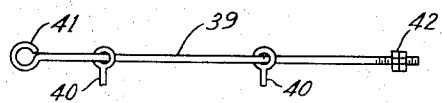
Fig. 8.
Fig. 9.
INVENTOR.
Arthur C. Brockman,
BY
Barnes Kisselle Laughlin & Raisch
ATTORNEYS.

United States Patent Office 2,871,027
Patented Jan. 27, 1959

2,871,027

SEMI-TRAILER STRUCTURE AND TRACTOR AND SEMI-TRAILER COMBINATION

Arthur C. Brockman, Birmingham, Mich.

Application June 21, 1956, Serial No. 592,883

13 Claims. (Cl. 280—425)

This invention relates to semi-trailer structure and semi-trailer tractor combination of the heavy duty type for carrying heavy loads and particularly loads comprised of large heavy units. The invention is concerned particularly with the type of vehicle commonly known as a low-bed trailer.

Vehicles of this type embody a tractor with a coupling thereon usually in the form of a lower fifth wheel member. The trailer has ground engaging wheels at its rear end and a low bed or platform which is much lower than the frame of the tractor. A third element, quite frequently referred to as a gooseneck, is generally of L-shape in structure. One leg of the L is generally horizontal in use and has an upper fifth wheel member or plate on its underside arranged to couple to and rest upon the lower fifth wheel on the tractor. The other leg of the L shape extends downwardly to the rear of the tractor and the lower end of this leg is joined to the forward end of the low bed of the trailer. All kinds of heavy machinery, including power shovels, road machinery with endless tracks, such as bulldozers and the like, are often transported by the low bed tractor-trailer vehicle.

It is often necessary or desirable to load the low bed trailer from its front end and to do this it is necessary to remove the gooseneck. Accordingly, such structures heretofore have arranged the gooseneck so that it can be disengaged or uncoupled from the front end of the low bed of the trailer. When so uncoupled, and the tractor and gooseneck moved out of the way, the bed of the trailer can be loaded from the front end, which is very close to the ground. For example, a heavy piece of equipment, such as road building machinery, bulldozers or power shovels, can be driven under their own power onto the low bed of the trailer.

Since the equipment is very heavy and the gooseneck itself is a large heavy fabricated steel structure, it has been a very difficult problem to provide a structure where the gooseneck can be uncoupled from the low bed trailer with facility and the gooseneck itself handled once it is disconnected from the low bed trailer. One proposal heretofore made is that of mounting a winch mechanism on the tractor which is connected to the gooseneck by cables to hold, manipulate or support the gooseneck when disconnected from the trailer. Because the goosenecks are so heavy, such winch mechanisms of necessity are heavy, strong and expensive. Furthermore, if not manipulated with great care, the winch mechanism or the cables are broken or destroyed. This has occurred in improper operation when the winch mechanism is operated without a separation or proper separation from the trailer.

An object of this invention is to provide an improved construction wherein the trailer and gooseneck can be coupled and uncoupled with facility and with positiveness of action without the requirement of any power means other than that of the tractor itself. The entire function of coupling and uncoupling may be accomplished by forward and backward motion of the tractor. Moreover, this is accomplished without requiring heavy work or duty on the part of an operator, and one operator can complete the entire cycle of uncoupling and coupling or vice versa. In this connection it should be borne in mind that the equipment is so heavy that no piece thereof can be lifted or manipulated by the physical efforts of an operator. A structure made in accordance with the invention is disclosed in the accompanying drawings:

Fig. 1 is a side elevation of a tractor and semitrailer combination showing the semitrailer in position for loading, the gooseneck being detached and supported on the tractor, part of the gooseneck being shown in section for clearness in illustration.

Fig. 2 is a side elevation similar to Fig. 1 showing the semitrailer with its gooseneck attached and supported at its forward end on the tractor.

Fig. 3 is a fragmentary cross sectional view taken on line 3—3 of Fig. 1.

Fig. 4 is an enlarged fragmentary top plan view of the rear of a tractor, the gooseneck member, and the front portion of the trailer body member, showing them in the alignment endwise of the trailer and detached from each other, part of the gooseneck member being shown in section for clearness in illustration.

Fig. 5 is a side elevation of the structure illustrated in Fig. 4.

Fig. 6 is an enlarged vertical cross sectional view taken on the line 6—6 in Fig. 5.

Figs. 7a through 7m are diagrammatic side elevations of a portion of a tractor, a gooseneck member and a trailer body member, illustrating the successive steps of connecting and disconnecting the members.

Figs. 8 and 9 are side elevations, respectively, of suitable one-way restrainers which may be used in connection with the present invention.

Referring first to Figs. 1 through 5, the trailer comprises a body member, indicated generally at 1, of the drop deck type. The body member is supported at the rear on suitable wheels 2. The body member 1 has the usual platform deck supported principally by longitudinal sills 3 which extend entirely to, and forwardly beyond, the forward end of the body member 1. On the forward ends of the sills 3 are connecting lugs 4 for coupling the body member 1 to a gooseneck member 5. The lugs 4 have inclined upper surfaces 4a and may be formed each with a notch 4b at the forward underside thereof.

The gooseneck member 5 of the trailer comprises an upper forwardly extending portion 6 and a rear depending lower portion 7. At its lower end, the portion 7 is provided with a pair of sockets 8 which are configured internally so as to receive and fit the lugs 4. Each socket may have a sort of projection 8a to be received in the notch 4b in the corresponding lug.

In the form shown for purposes of illustration, the lugs 4 are on the body member and cooperating sockets are on the lower rear portion of the gooseneck member, but it is apparent that the sockets may be provided on the body member and the lugs on the gooseneck member, if desired.

On the undersurface of the forward portion of the gooseneck member 5 are skid plates 9 and a forward skid plate and a fifth wheel element 10 which is coextensive laterally with the gooseneck member. In normal operation the gooseneck member is attached to a tractor, indicated generally at 11, having the usual longitudinal sills or frame members 12 on which is mounted a fifth wheel element 13 complementary to the fifth wheel element 10. The fifth wheel element 13 is arranged to rock about a horizontal axis which extends transversely of the tractor, all in a well known manner.

In accordance with the present invention there is provided on the tractor, rearwardly from the fifth wheel element 13, a ramp, indicated generally at 14, which comprises two laterally spaced ramp members 15 each of which has an upwardly exposed skid surface which slopes upwardly from the rear of the tractor toward, and at its forward end terminates close to the level of, the fifth wheel element 13. The fifth wheel element 13 is arranged to receive a connecting pin 16 of the fifth wheel element 10 by movement of the pin 16 radially into the socket of the element 13 in a direction forwardly of the tractor. The skid plates 9 and fifth wheel plate 10 of the gooseneck member are positioned so that when the gooseneck member is in proper alignment for coupling to the tractor, the plate 10 and skid plates 9 are aligned with the skid surfaces of the ramp memebrs 15.

Referring next to Fig. 2, a connector or restrainer preferably in the form of a tensile element, such as a chain 18 is connectable to the rear of the tractor and to the gooseneck memebr. This chain is detachably connectable by means of a hook on one end thereof as shown in Fig. 5.

The chain 18 is arranged to provide a connection between the tractor and the gooseneck member and it functions in certain operations as will later appear to limit the separating movement of the tractor and gooseneck member.

In addition to the connector 18, another connector 19 is provided, one end being attached to the rear end of the gooseneck member and the other end being readily attachable to, and detachable from, a suitable eye-bolt 20 on the forward end of the trailer body member. The connector 19, likewise, may be in the form of an ordinary chain and is of such length that, when it is connected to the eye-bolt 20, the rear limit of the gooseneck member, as indicated at 21, is restrained from moving forwardly relative to the trailer body member beyond a position in which the rear limit overlies the forward portion of the lugs 4 and thus supports the rear of the gooseneck member thereon.

Thus the connector 18 operates so that the gooseneck member is constrained from moving rearwardly of the tractor beyond a position in which the forward end of the forward portion rests on the ramp 14 yet is left free to move forwardly relative to the tractor and thus slide up the ramp into the coupling position of the fifth wheel elements.

The connector 19 operates so that the gooseneck member is constrained from movement forwardly relative to the body member beyond a position in which its lower rear portion is supported on the lugs 4, yet is left free to move rearwardly of the body member to a position in which the lugs 4 are fully engaged with the sockets 8.

In addition to these connectors, another connector 22 is provided. The connector 22 is operatively interposable between the tractor and gooseneck member so as to limit the movement of the gooseneck member forwardly up the ramp from its lowered position and constrain it to move rearwardly with the tractor. In the form illustrated, the connector 22 is a chain which is connected at one end to an eye-bolt 23 on the tractor and at the other end is connectible to a suitable eye-bolt 24 on the forward end of the gooseneck. The ends of the connecting tensile elements which are permanently attached may be reversed. For example, the chain 19 may be permanently connected to the trailer body with a detachable connection with the gooseneck and the same applies to the chains 18 and 22.

Referring again to Fig. 4, it is to be noted that the lugs 4 are provided with apertures 25 which, when the lugs and sockets are fully coupled, are aligned with apertures 26 in the top walls of the sockets 8, respectively. These apertures are adapted to receive pins 27 which interlock the body member and gooseneck member and prevent separation thereof when the pins 27 are inserted through the aligned apertures 25 and 26.

In addition to the apertures 26, the top walls of the sockets 8 are provided with apertures 28. The apertures 28 are adapted to receive the pins 27 to serve to block movement of the lugs 4 into the sockets in certain manipulations of the structure as will presently appear.

Suitable sleeves 29 and 30 are provided on the rear of the gooseneck member in coaxial relation to the apertures 26 and 28 respectively. The sleeves as shown are at an angle to the vertical although they may be vertical for a corresponding vertical position of the pins 27.

Referring next to Figs. 7a through 7m, the manner in which the gooseneck member and body member may be manipulated by the tractor without the use of any winch or special mechanism is illustrated.

Referring first to Fig. 7a, the tractor, semi-trailer including the body member and gooseneck member, and the various restrainers are illustrated in an exploded view.

Referring to Fig. 7b, they are shown in a normal coupled relation ready for detachment with the connectors 18 and 19 connected.

Fig. 7c illustrates the first step of disconnection.

It is to be noted that the pins 27 have been withdrawn from the apertures 25 and 26, and from the sleeves 29 and placed in the sleeves 30. Since the lugs 4 are fully inserted in the sockets 8, the pins 27 cannot drop down through the apertures 28 but remain in a position ready to drop by gravity when the lugs are sufficiently withdrawn. The fifth wheel coupling has been operated to release the pin 16.

In this condition, the tractor 11 is moved forwardly, or to the right, as illustrated in Fig. 7d. As a result of this movement, the brakes on the semitrailer having been set, the tractor moves forwardly relative to the gooseneck member so that the forward end of the gooseneck slides down the ramp 14 to its rearmost position to which it is limited by the chain 18. A suitable block 31 is placed in position beneath the forward end of the body member preparatory to the operation described so as to limit the downward movement of the body member and maintain the lugs 4 above the level of the ground. Of course, this operation can result in the forward end of the gooseneck member being held slightly above the ramp at the time that the restrainer 18 is taut. Continued movement of the tractor 11 forwardly from the position illustrated in Fig. 7d, after the restrainer 18 is operative, to the position illustrated in Fig. 7e, results in forward movement of the gooseneck member relative to the body member or lugs 4. The gooseneck member moves forward to the limit determined by the chain 19 and thus the lugs and the sockets are partially disconnected. When the gooseneck member has reached this extreme forward position, the pins 27 have been freed and have dropped into the sockets 8 in position to block re-entry of the lugs thereinto.

Next, the tractor is backed toward the body member, as illustrated in Fig. 7f, and the pins 27 engage the forward ends of the lugs 4. Continued backing of the tractor causes the gooseneck member to be pushed forwardly relative to the tractor by engagement of the lugs 4 and pins 27, thus causing the forward end of the gooseneck member to skid up the ramp 14 to a position in which its pin 16 is coupled to the fifth wheel element 13 of the tractor. While in this position a block 32 is interposed between a frame member 33 of the tractor and a cross member 34 of the gooseneck member, as best illustrated in Fig. 3, so as to support the gooseneck in the position illustrated in Fig. 7g through the medium of the block 32 and the fifth wheel element 13. However, a block may be inserted between the forwardly extending arm of the gooseneck member and the ramp 14. If desired, a jack may be used instead of the block 32, and such has advantages in effecting adjustment of the members for coupling.

The chain or restrainer 19 is then disconnected and the tractor moved forwardly, as illustrated in Fig. 7h, carrying with it the gooseneck member which is supported thereon with its rear portion clear of the ground. It is to be noted that the gooseneck member is formed with side frame members 35 which are spaced apart from each other and which project downwardly below the level of the cross member 34. The block 32 is preferably of a size to fit snugly between the ramp elements 15 and between the side members 35 of the gooseneck member. Thus the block 32 not only supports the gooseneck member in an elevated position but locks it against swinging laterally about the axis of the pin 16.

It is to be noted that when the gooseneck is thus detached and no longer carries the weight of the loaded trailer body member, the springs of the tractor partially restore themselves and lift the gooseneck member to a level above the level of its loaded position shown in Fig. 7b. Accordingly, the gooseneck member is relatively elevated and this may influence the recoupling of the gooseneck member and trailer body particularly if the vehicles are on very level pavement as will soon appear. With the parts thus separated as shown in Fig. 7h, the tractor may be moved out of the way and the low bed of the trailer loaded or unloaded from its disconnected front end.

After the trailer has been either loaded or unloaded the elements of the vehicle may be reconnected by the procedure indicated in Figs. 7i to 7m inclusive. Referring first to Fig. 7i, the tractor with the gooseneck member supported thereon by the fifth wheel member 13 and block 32 is backed toward the trailer body, the pins 27 being in blocking relation within the sockets 8 where they were left upon detachment of the gooseneck member. The tractor is aligned as near as may be with the trailer body and upon continued backing the lugs 4 enter part way of the sockets 8 and strike the pins 27. Thereupon the chain 19 is manipulated to connect the gooseneck member and trailer and the fifth wheel coupling is disengaged. The chain 18 is left in connected condition. It is at this point that the increased height of the gooseneck member which took place when it was released as shown in Fig. 7h may be considered. The condition shown in Fig. 7i may be effected without the use of the pins 27 because the leading ends of the lugs 4, that is, the ends just above the notches 4b, may strike the blocks or portions 8a of the sockets. Under these conditions the lugs cannot enter the sockets even though the pin 27 be not used for blocking purposes and the chain 19 may be coupled at this time.

The tractor is then driven forwardly, as illustrated in Fig. 7j, and, due to the restrainer 19, the gooseneck is held from movement with the tractor and thus the forward end of the gooseneck member travels down the ramp 14 to its maximum rearward lowered position which is determined by the chain 18. This movement causes the block 32 to fall off of the cross member 33 so that the gooseneck member can rock vertically about its forward end.

Next the pins 27 are removed from the sleeves 30 and placed in the sleeves 29. The chain 22 is then manipulated to connect the tractor and the gooseneck member as shown in Fig. 7j. Now on backward movement of the tractor the gooseneck member can move up the ramp only to the extent determined by the chain 22 as indicated in Fig. 7k. Upon continued backward movement of the tractor from the position shown in Fig. 7k the gooseneck is pushed backwardly until the lugs are fully received in their sockets and the pins 27 drop into the apertures 25.

The tractor is then driven forwardly slightly to loosen the restrainer chain 22 which is then detached, and the tractor again is backed toward the trailer, as illustrated in Fig. 7l. This backing causes the gooseneck member to slide up the ramp 14. This rearward movement continues until the gooseneck is in a position in which the pin 16 is connected with the fifth wheel member 13 in which case the tractor gooseneck member and body member are restored to their original load transporting condition. The parts are now in the position as shown in Fig. 7m. The several chains may remain connected at one end to their respective elements but may be compacted so that they are out of the way for normal operation. For instance, the chain 22 may be placed on the tractor frame between the portions of the ramp. The chains 18 and 19 may be placed upon the forward end of the trailer frame between the two parts of the downwardly extending portion of the gooseneck.

In the description heretofore made, the restrainers were disclosed as simple chains of high alloy steel of high tensile strength. However, other types of restrainers may be used, for example, a restrainer 36 formed of two rods telescopically connected as illustrated in Fig. 8 may be used. Again, a simple rod 39 may be received in eyebolts 40 on the respective body and gooseneck members and be of such length that when the members are in their maximum operated position an enlarged end 41 of the bolt and a nut 42 at the opposite end may engage the eyebolts and prevent further separation of the members. The high alloy chains are preferred to other forms of restrainers, however, in that they are much more easily handled.

Since the restrainer or chain 22 is merely to prevent forward movement of the gooseneck member relative to the tractor beyond a predetermined position under certain conditions, it is apparent that a compression element may be used and operatively interposed between the gooseneck member and the tractor body to effect an equivalent operation.

In the structure herein described, by the means of simple chain restrainers and proper manipulation of the tractor, one man unassisted can readily couple and uncouple the gooseneck member from the trailer body member and can do so without the necessity of using a winch or providing any special equipment other than the simple restrainers, the pins 27, and sleeves 29 and 30.

I claim:

1. In a tractor-trailer combination in which a fifth wheel element is mounted on the tractor and the trailer includes a body member and a detachable gooseneck member having an upper forwardly extending portion on the underside of which is a complementary fifth wheel element engageable in coupling relation to the first fifth wheel element and one of said members has sockets opening toward the other member and the other member has connecting lugs receivable in the sockets for connecting a lower rear portion of the gooseneck member to the body member upon relative movement of the members toward each other endwise of the body member into a final coupling relation, and means to connect the members against separation endwise of the body member when the lugs and sockets are in said final coupling relation; the improvement comprising ramp means on the tractor and sloping downwardly and rearwardly from the fifth wheel element on the tractor and on which said forward portion of the gooseneck member can be supported and up which it can be slid into position for coupling the tractor and gooseneck member by the fifth wheel elements, a first one-way restrainer connecting the tractor and gooseneck member so as to limit relative rearward movement of the gooseneck member to a rearmost position in which said forward portion is supported on the ramp means rearwardly from, and below the level of, the tractor fifth wheel member and so as to leave the gooseneck member free for movement of said forward portion up and down the ramp means in front of said rearmost position, a second one-way restrainer detachably connecting the gooseneck member and body member so as to limit relative movement of the gooseneck member forwardly of the body member to a forward position in which the sockets and lugs are out of said final coupling relation but said rear portion is supported above ground level through the medium of the body member, movable blocking means for said members and operable in one position relative to one of them to block reentry of the lugs into interfitting coupling relation in the sockets after the lugs have been withdrawn from said coupling relation, and a third restrainer operatively interposable between the tractor and gooseneck member so as to constrain the tractor and gooseneck member to move together in a direction rearwardly of the tractor when said movable blocking means has been moved to another position.

2. In a tractor-trailer combination in which a fifth wheel element is mounted on the tractor, and is accessible for coupling from the rear of the tractor, and the trailer has a gooseneck member having a forward portion on the underside of which is a complementary fifth wheel element and having a lower rearward portion on which are rearwardly open sockets, and the trailer has a body member which has, on its front end, forwardly projecting lugs receivable endwise of the trailer in the sockets, respectively, in a final coupling relation, and means to connect the gooseneck member and the body member against separation endwise of the body member when the lugs and sockets are in final coupling relation; a ramp on the tractor sloping downwardly and rearwardly from the fifth wheel element on the tractor and on which the forward portion of the gooseneck member can be supported and up which it can be slid into position for coupling the fifth wheel elements, a first chain connecting the tractor and gooseneck member so as to limit relative rearward movement of the gooseneck member to a rearmost position in which said forward portion is supported on a portion of the ramp below the level at which the gooseneck member is located when the fifth wheel elements are coupled, and permitting movement of the gooseneck member up and down the ramp in front of said rearmost position, a second chain detachably connecting the gooseneck member and trailer and limiting relative movement of the gooseneck member forwardly of the body member to a forward position in which the lugs are out of said final coupling relation to the sockets while the rear of the gooseneck member is supported through the medium of the lugs, movable blocking means for the members operable in one position to block entry of the lugs back into final coupling position in the sockets when the lugs are out of said final coupling position, and means operatively interposable between the tractor and gooseneck member to cause the tractor to move the gooseneck member rearwardly with the tractor when said movable blocking means is moved to another position.

3. In a tractor-trailer combination, a tractor having a lower fifth wheel member and a ramp rearwardly of the fifth wheel member which slopes rearwardly and downwardly, a trailer body, a gooseneck member having a forwardly extending portion with an upper fifth wheel member on its underside detachably connectable with the lower fifth wheel member, said gooseneck member having a downwardly extending rear portion, coupling means between the forward end of the trailer body and the rear portion of the gooseneck member engageable and disengageable by relative movement lengthwise of the trailer body, a first means for detachably interconnecting the tractor and the gooseneck member for limiting the separation of the tractor and gooseneck member as the tractor is moved forwardly with the fifth wheel members disengaged, so that the forwardly extending portion of the gooseneck member rests upon the ramp, a second means for detachably interconnecting the trailer body and the gooseneck member for limiting movement of the gooseneck member forwardly relative to the trailer body upon forward movement of the tractor, to partially disengage said coupling means, blocking means for preventing relative movement of the said coupling means toward fully engaged position as the tractor is moved backwardly, whereby the coupling means remain partially disengaged and the fifth wheel members become engaged, and means on the tractor for receiving a support for the gooseneck member, whereby the gooseneck member is supported and carried by the tractor as the tractor moves forwardly with the said second means disengaged for complete disconnection of said coupling means.

4. In a tractor-trailer combination, a tractor having a lower fifth wheel member and a ramp rearwardly of the fifth wheel member which slopes rearwardly and downwardly, a trailer body, a gooseneck member having a forwardly extending portion with an upper fifth wheel member on its underside detachably connectable with the lower fifth wheel member, said gooseneck member having a downwardly extending rear portion, coupling means between the forward end of the trailer body and the rear portion of the gooseneck member engageable and disengageable by relative movement lengthwise of the trailer body, a first means for detachably interconnecting the tractor and the gooseneck member for limiting the separation of the tractor and gooseneck member as the tractor is moved forwardly with the fifth wheel members disengaged, so that the forwardly extending portion of the gooseneck member rests upon the ramp, a second means for detachably interconnecting the trailer body and the gooseneck member for limiting movement of the gooseneck member forwardly relative to the trailer body upon forward movement of the tractor, to partially disengage said coupling means, blocking means movable to one position for preventing relative movement of the said coupling means toward fully engaged position as the tractor is moved backwardly, whereby the coupling means remain partially disengaged and the fifth wheel members become engaged, and means on the tractor for receiving a support for the gooseneck member, whereby the gooseneck member is supported and carried by the tractor as the tractor moves forwardly with the said second means disengaged for complete disconnection of said coupling means, and a third means for detachably interconnecting the tractor and gooseneck member, operable when the forwardly extending portion rests upon the ramp and the coupling means is in the position of partial engagement and the blocking means is moved from said one position, to cause the gooseneck member to move rearwardly upon rearward movement of the tractor, to position the coupling means in full engagement, whereby upon detachment of said third means and upon continued rearward movement of the tractor the forward portion of the gooseneck rides up the ramp and the fifth wheel members become engaged.

5. The tractor-trailer combination as recited in claim 4 characterized in that the coupling means between the trailer body and the gooseneck member comprises, interengaging lug members and recess members, some on the trailer body and some on the gooseneck member, said blocking means being positionable with respect to some of the members to block entrance of the lug members into the recess members from partially disengaged position to fully engaged position.

6. The tractor-trailer combination as recited in claim 4 characterized in that the coupling means between the trailer body and the gooseneck member comprises, lugs on the trailer body and recesses in the gooseneck member arranged to interfit when coupled, said blocking means being insertable with respect to the socket members for preventing the lugs from shifting from partially engaged position to full engaged position in the sockets.

7. The tractor-trailer combination as recited in claim 3 characterized in that the first and second means for respectively interengaging the tractor and gooseneck member and the gooseneck member and trailer body are comprised of flexible tension elements each having detachable connecting means adjacent one end.

8. The tractor-trailer combination as recited in claim 4 characterized in that the said first, second, and third means are flexible tension elements each having a detachable connector adjacent one end.

9. A trailer structure for use with a tractor having a lower fifth wheel member and a ramp to the rear thereof which slopes downwardly and rearwardly, comprising, a trailer body, a gooseneck member having a forwardly extending portion and an upper fifth wheel member on its underside detachably connectable to the lower fifth wheel member, said gooseneck member having a downwardly extending rear portion, coupling means between the forward end of the trailer body and the rear portion of the gooseneck member engageable and disengageable by relative movement lengthwise of the trailer body, first means on the gooseneck member adapted to be detachably connected to a tractor to limit the separation of the tractor and gooseneck member when the tractor moves forwardly with the fifth wheel members disconnected so that the forwardly extending portion of the gooseneck member rests upon said ramp, second means on the trailer body adapted to be detachably connected to the gooseneck member to limit movement of the gooseneck member forwardly relative to the trailer body so that said coupling means is maintained in partially disengaged position, and blocking means positionable with respect to the coupling means to block movement of the coupling means from said partially disengaged position toward fully engaged position upon rearward movement of the tractor.

10. The trailer structure as recited in claim 9 characterized in that there is a third means on the gooseneck adapted to be detachably connected to the tractor to cause rearward movement of the gooseneck member when the tractor is moved rearwardly with the fifth wheel members disconnected.

11. The trailer as recited in claim 9 characterized in that said coupling means comprises interengaging lugs and recesses on the trailer body and gooseneck member, and said blocking means comprises elements insertable to block movement of the lugs into the recesses from the position of partial disengagement.

12. The trailer as recited in claim 10 characterized in that said first, second and third means are devices adapted to be connected to flexible tension elements.

13. In a trailer having a gooseneck member and body member with socket means on one of the members and complementary connecting lug means on the other of the members engageable in coupling position with the socket means upon movement of the members endwise of the body member toward each other, blocking means mounted for movement between an idle position and a blocking position wherein it extends transversely of said socket means and blocks entry of said lug means into said socket means to said coupling position, means supporting said blocking means in said idle position when said members are in coupling position, said gooseneck member including interconnecting means adapted to be connected to a tractor to facilitate movement of said members endwise of said body member in a direction away from each other, said blocking means being movable from said idle position to said blocking position responsively to said movement of said members to a position of partial engagement of said lug means and coupling means, whereby to prevent return of said members to said coupling position, and constraining means detachably interconnecting said members, said constraining means securing said members against movement away from each other beyond the position of partial engagement of said socket means and lug means.

References Cited in the file of this patent

UNITED STATES PATENTS

| 2,389,211 | Pointer | Nov. 20, 1945 |
| 2,667,363 | Talbert | Jan. 26, 1954 |